Nov. 20, 1928.

H. C. ASH 1,692,794

RECEPTACLE

Filed Aug. 9, 1926

Inventor

HENRY C. ASH.

By Geo. Stevens.

Attorney

Patented Nov. 20, 1928.

1,692,794

UNITED STATES PATENT OFFICE.

HENRY C. ASH, OF DULUTH, MINNESOTA.

RECEPTACLE.

Application filed August 9, 1926. Serial No. 128,052.

This invention relates to improvements in receptacles, and has special reference to a novel form of such particularly designed for use as an anti-slopping pan, such being especially desirable for use in connection with household refrigerators, the principal object being to produce a simple, cheap and sturdy pan for such purpose.

Other objects and advantages of the invention will appear in the further description thereof.

Referring now to the accompanying drawing, forming part of this application, and in which like reference characters indicate like parts:

The pan is preferably formed of a single piece of rectangularly shaped metal, being first cut at an angle of 45 degrees in the four corners thereof inwardly a suitable distance to form the desired height of the sides thereof. Then the side and end walls are folded upwardly and inwardly with their ends overlapping, there being formed an acute angle about the lower marginal edges of the bottom of the pan, and the four sides of which marginal edge are substantially straight and defined by the inner extremities of the diagonal cuts above referred to.

When such a pan is made for a refrigerator drip pan I prefer to form same having a front side and rear side, and in so doing the ends of the front side wall are brought about and overlap the adjacent ends of the end walls externally thereof so as to provide a smooth uninterrupted surface upon the front side of the pan from end to end with the object that lettering or advertising matter may be printed thereupon in the most convenient manner possible.

Figure 1:
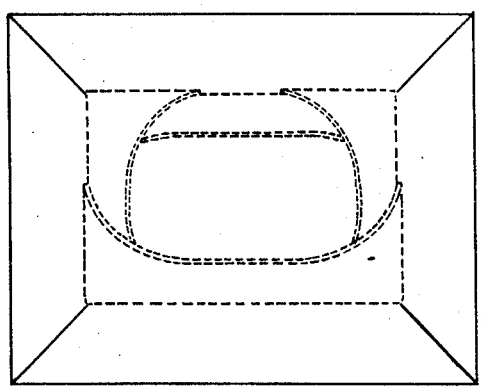
Figure 1 is a plan of the pan lay-out before being formed.
Figure 2:
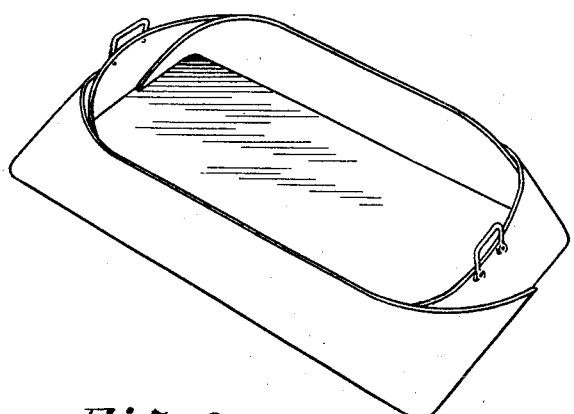
Figure 2 is a perspective view of one of the completed pans embodying the invention.

The free ends of the back wall of such a pan are preferably brought inside of the free ends of the end walls so that the latter overlap them externally thereof, such overlapping arrangement of the ends particularly being for the purpose of providing against the necessity of having to cut the extreme corners of the overlapping portions should the relative depth of pan be such as to necessitate same were the overlapping portions of the two sides or two ends brought about upon the same side either externally or internally of the cooperating side or end; this construction of pan being clearly illustrated in Figure 2 of the drawings.

In any event and to accomplish the anti-slopping feature of the pan the diagonal end of both side and end members is brought fully down parallel with the bottom of the pan, and there secured either by riveting, soldering, or other desired manner, so as to result in a thoroughly united, reinforced, water-tight corner. In this manner a pan is formed having all sides inwardly inclined with rounded corners upon the upper edge thereof, the dimensions of the upper open edge of the pan being materially less than that of the bottom, and suitable handles of any desired form may be installed upon either the sides or ends as preferred.

Having thus described my invention, what I claim and desire to secure by Letters Patent, is:

A receptacle of the class described characterized by being formed of a single sheet of metal cut inwardly in equal distances on the four corners thereof at an angle of forty-five degrees and the corners made to overlap each other with the cut edges thereof brought into the same plane with the bottom, forming a receptacle having a rectangular bottom and an elliptical opening for the purpose described.

In testimony whereof I affix my signature.

HENRY C. ASH.